United States Patent
Zurlo

(10) Patent No.: US 7,383,816 B2
(45) Date of Patent: Jun. 10, 2008

(54) VIRTUAL FUEL QUALITY SENSOR

(75) Inventor: James Richard Zurlo, Shorewood, WI (US)

(73) Assignee: Dresser, Inc., Addison, TX (US)

( * ) Notice: Subject to any disclaimer, the term of this patent is extended or adjusted under 35 U.S.C. 154(b) by 325 days.

(21) Appl. No.: 11/328,425

(22) Filed: Jan. 9, 2006

(65) Prior Publication Data

US 2007/0157903 A1    Jul. 12, 2007

(51) Int. Cl.
*F02P 5/00* (2006.01)
*G06F 19/00* (2006.01)

(52) U.S. Cl. .................... 123/406.3; 701/111
(58) Field of Classification Search ............. 123/406.3; 701/111
See application file for complete search history.

(56) References Cited

U.S. PATENT DOCUMENTS

| | | | |
|---|---|---|---|
| 4,372,119 A | 2/1983 | Gillbrand et al. | |
| 4,700,677 A | 10/1987 | Bonitz et al. | |
| 4,788,957 A | 12/1988 | Komurasaki | |
| 6,041,756 A | 3/2000 | Bonne | |
| 6,246,952 B1 | 6/2001 | Honda | |
| 6,246,953 B1 | 6/2001 | Quinn et al. | |
| 6,247,448 B1 | 6/2001 | Scholl et al. | |
| 6,411,886 B1 | 6/2002 | Morra et al. | |
| 6,427,662 B2 | 8/2002 | Tanaya et al. | |
| 6,439,198 B2 | 8/2002 | Lehner et al. | |
| 6,522,959 B1 * | 2/2003 | Sawamura et al. | 701/99 |
| 6,546,328 B1 | 4/2003 | Slicker | |
| 6,668,812 B2 | 12/2003 | Javaherian | |
| 6,694,960 B2 | 2/2004 | Hess et al. | |
| 6,712,042 B1 | 3/2004 | Kustosch | |
| 6,863,052 B2 * | 3/2005 | Takahashi et al. | 123/406.13 |
| 2001/0020465 A1 | 9/2001 | Baeuerle et al. | |
| 2002/0029105 A1 | 3/2002 | Sauler et al. | |
| 2002/0072844 A1 | 6/2002 | Gras et al. | |
| 2003/0164156 A1 | 9/2003 | Galtier | |
| 2004/0030486 A1 | 2/2004 | Sauler et al. | |

(Continued)

FOREIGN PATENT DOCUMENTS

GB    2 156 905    10/1985

(Continued)

OTHER PUBLICATIONS

Hudson, C. et al.; "Knock Measurement for Fuel Evaluation in Spark Ignition Engines"; Fuel, IPC Science and Technology Press; Guildford, GB; vol. 80, No. 3; Feb. 3, 2001.

(Continued)

*Primary Examiner*—Stephen K. Cronin
*Assistant Examiner*—Arnold Castro
(74) *Attorney, Agent, or Firm*—Fish & Richardson P.C.

(57) ABSTRACT

A method of operating a multiple combustion chamber internal combustion engine includes advancing an ignition timing of a first subset of the combustion chambers from an operating ignition timing until a knock event is detected while concurrently operating the remaining combustion chambers at the operating ignition timing. A first knock margin of the first subset of combustion chambers is determined in relation to a difference between the operating ignition timing and the ignition timing at the knock event. A characteristic of a fuel supplied to the combustion chambers is determined in relation to at least the first knock margin.

20 Claims, 3 Drawing Sheets

| U.S. PATENT DOCUMENTS | | | | WO | 2004/111416 | 12/2004 |

2004/0084020 A1    5/2004   Daniels et al.
2007/0150165 A1*   6/2007   Saikkonen et al. ......... 701/111

FOREIGN PATENT DOCUMENTS

JP        04-234571      8/1992

OTHER PUBLICATIONS

International Search Report and the Written Opinion of the International Searching Authority issued in International Application No. PCT/US2007/000385; Jul. 3, 2007; 11 pages.

* cited by examiner

VIRTUAL FUEL QUALITY SENSOR

TECHNICAL FIELD

This invention relates to internal combustion engines, and more particularly to operating internal combustion engines.

BACKGROUND

Typically, the parameters on which an engine is operated are selected to account for variations in the fuel supplied to the engine and variations in the efficiency of the engine itself. In many instances, the engine's operation is sub-optimal, because the parameters are selected to maintain engine operation on the lowest of a range of fuel qualities and the worst of a range of engine conditions. For example, an engine may receive fuel with a high knock resistance at some point in its operation and fuel with a low knock resistance at another point in its operation, and must be able to operate on both. In another example, a newly commissioned engine is in top mechanical shape, but over time, build-ups in the combustion chambers and wear of the sealing surfaces reduce the engine's efficiency. The engine's operating parameters; however, are selected to operate the engine throughout its life span. Accordingly, they may be sub-optimal when the engine is new and sub-optimal near the end of Some engine systems have been configured to adjust the operating parameters to account for various factors that affect the engine's efficiency. There is a need for such type of engine systems that adjust the operating parameters to account for variations in fuel quality and engine condition.

SUMMARY

The disclosure herein relates to operating internal combustion engines.

One aspect encompasses a method of operating a multiple combustion chamber internal combustion engine. In the method, an ignition timing of a first subset of the combustion chambers is advanced from an operating ignition timing until a knock event is detected while concurrently operating the remaining combustion chambers at the operating ignition timing. A first knock margin of the first subset of combustion chambers is determined in relation to a difference between the operating ignition timing and the ignition timing at the knock event. The ignition timing in a second subset of the combustion chambers is advanced from an operating ignition timing until a knock event is detected while concurrently operating the remaining combustion chambers at the operating ignition timing. A second knock margin of the second subset of combustion chambers is determined in relation to a difference between the operating ignition timing and the ignition timing at the knock event. Additional subsets can be advanced and additional knock margins determined as desired, and in some instances until all combustion chambers of the internal combustion engine have been analyzed. A characteristic of a fuel supplied to the combustion chambers is determined in relation to at least the first and second knock margins.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
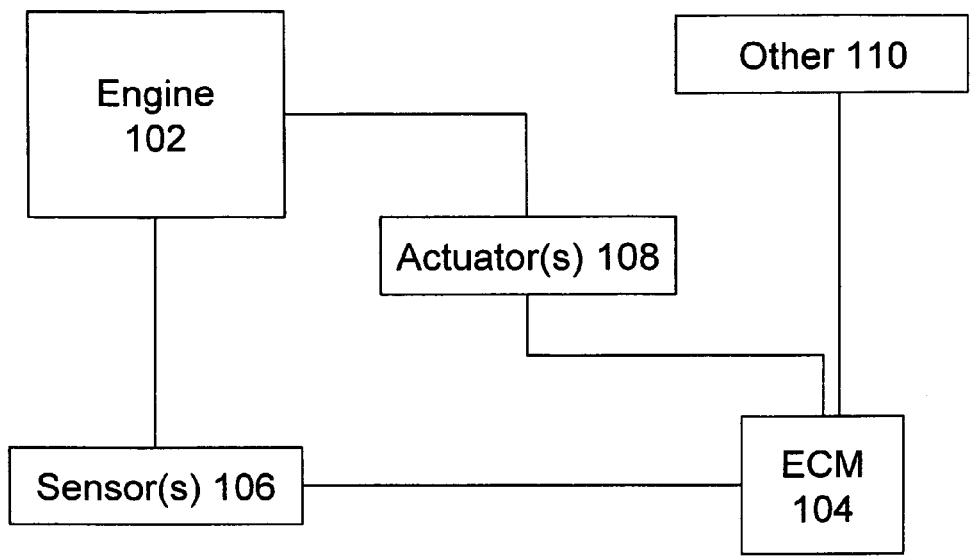
FIG. 1 is a schematic of an illustrative engine system constructed in accordance with the invention.

Referring first to FIG. 1, an illustrative engine system 100 constructed in accordance with the invention is depicted schematically. The engine control system 100 includes an engine control module (ECM) 104 operably coupled to communicate with one or more engine sensors 106 and one or more actuators 108. The engine sensors 106 may be coupled to a reciprocating internal combustion engine 102, and sense one or more operating characteristics of the engine 102 and/or engine system 100 and output a signal representative of the operating characteristic. Some examples of typical engine operating characteristics include engine speed, a torque indicating characteristic such as manifold absolute pressure (MAP) or intake manifold density (IMD), power output of the engine, a characteristic indicative of the engine's air to fuel ratio such as exhaust oxygen content, ambient and/or engine temperature, ambient pressure, and others. The actuators 108 are adapted to control various engine system components (not specifically shown) used in controlling the engine and other engine system components. Some examples of typical engine components include a throttle, a turbocharger bypass or waste gate, an ignition system, air/fuel regulating device such as an adjustable fuel mixer, a fuel pressure regulator, fuel injectors and others. The ECM 104 may also be coupled to communicate with other components 110. Some examples of other components 110 can include a user interface that allows a user to query the ECM 104 or input data or instructions to the ECM 104, one or more external sensors that sense information other than the operating characteristics of the engine or engine system, monitoring or diagnostic equipment to which the ECM 104 can communicate characteristics of the system, and others.

Figure 2:
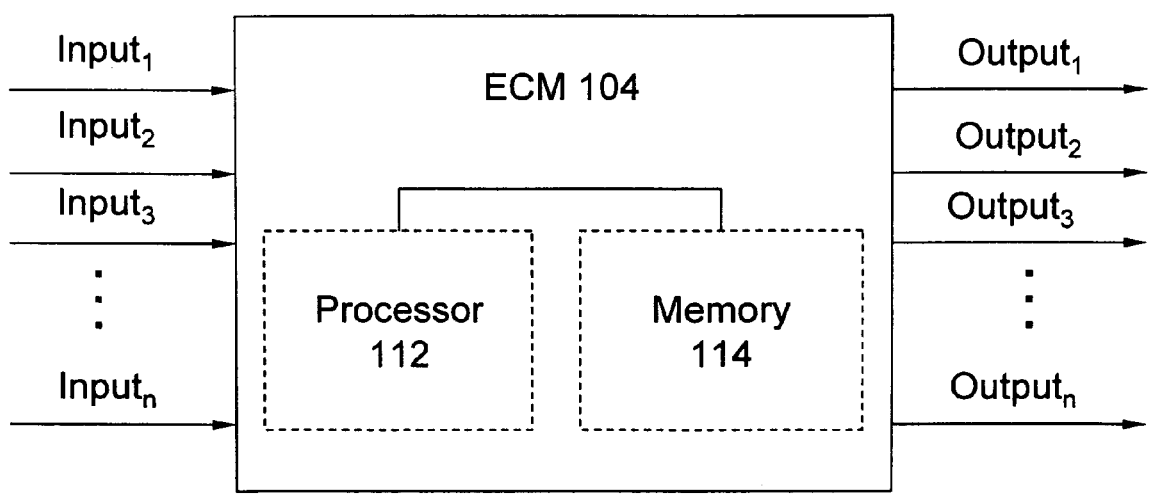
FIG. 2 is a schematic of an illustrative engine control module for use in an engine system constructed in accordance with the invention.

Referring to FIG. 2, the ECM 104 includes a processor 112 operably coupled to a computer readable medium or memory 114. In some instances, the computer readable medium 114 may be wholly or partially removable from the ECM 104. The computer readable medium 114 contains instructions used by the processor 112 to perform one or more of the methods described herein. The ECM 104 can receive one or more input signals (input$_1$ . . . input$_n$), such as from the sensors 106, actuators 108, and other components 110 and can output one or more output signals (output$_1$ . . . output$_n$), such as to the sensors 106, actuators 108 and other components 110.

The ECM 104 operates to control ignition of a combustion mixture supplied to the engine in acceleration and deceleration and in steady state conditions. To this end, the ECM 104 receives input from the sensors 106, including engine state parameters, and determines and outputs one or more actuator control signals adapted to control the actuators 108 to operate the engine 102.

Figure 3:
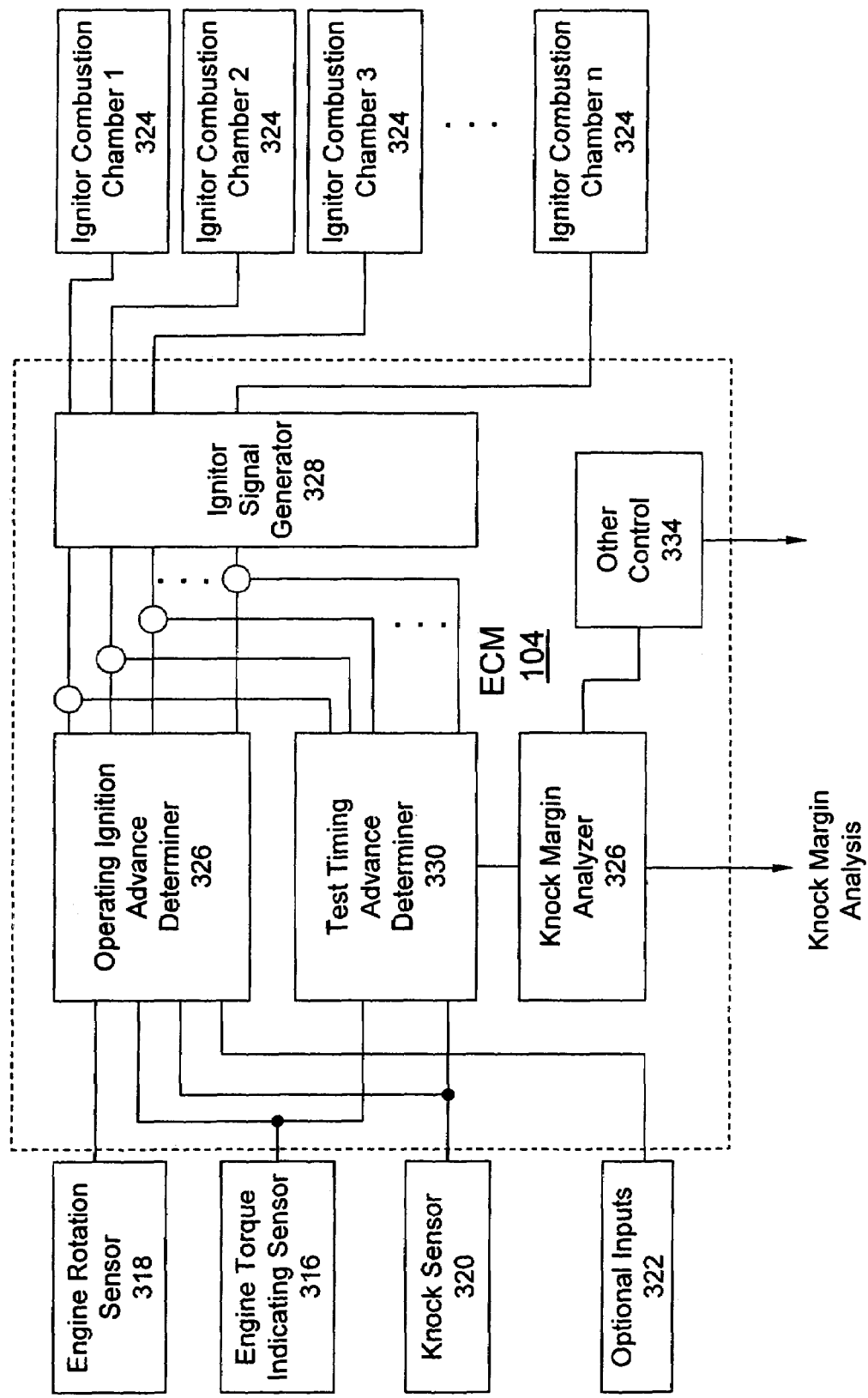
FIG. 3 is a schematic of the functional operation of an illustrative engine system constructed in accordance with the invention.

FIG. 3 depicts an illustrative ECM 104 for use in controlling ignition of fuel supplied to an engine. The illustrative ECM 104 of FIG. 3 receives an input of engine state parameters from the sensors 106 and outputs a signal to the actuators 108. In FIG. 3, the state parameters include outputs from a torque indicating characteristic sensor 316, such as a MAP or IMD sensor, an engine rotation sensor 318, and a knock sensor 320. Additional or fewer state parameters can be used. In a reciprocating internal combustion engine, the engine rotation sensor 318 directly or indirectly determines the crankshaft position. The illustrative ECM 104 can also receive input from one or more optional sensors 322. Some examples of optional sensors 322 include an intake air temperature sensor, a humidity sensor, a power sensor measuring power output by a generator driven by the engine, and other sensors. The actuators 108 include at least one ignitor 324. FIG. 3 depicts an ignitor 324 for each combustion chamber 1, 2, 3 . . . n of the engine. In one instance, the ignitor 324 is a spark plug. In other instances, the ignitor 324 can be numerous devices that can operate to ignite the combustion mixture within an internal combustion engine. Some illustrative examples can include a laser directed into the combustion chamber, a fuel injector in a pilot fuel ignition system adapted to direct a pilot fuel into the combustion chamber, or other device. A pilot fuel ignition system is a system that ignites a measured amount of a pilot fuel in the combustion chamber, using an ignitor or by compression, and the pressure and temperature increase caused by pilot fuel combustion, ignites a main fuel mixture in the combustion chamber. The ECM 104 receives an input from the torque indicating characteristic sensor 316 and the engine rotation sensor 318, and determines and outputs an actuator control signal to control the operation of the ignitors 324 as is discussed below.

The ECM 104 includes an operating ignition timing determiner 326 that receives one or more engine state parameters and optional additional parameters, and determines an operating ignition timing. The operating ignition timing determiner 326 outputs a signal to an ignitor signal generator 328 that signals the one or more ignitors 324 to actuate in accordance with the operating ignition timing. The operating ignition timing indicates when, relative to another event in operation of the engine system, an ignitor 324 should be actuated to begin an ignition event under normal operating conditions (versus test conditions described below). In a reciprocating internal combustion engine, the operating ignition timing can be referenced relative to a crank position. In determining the operating ignition timing, the operating ignition timing determiner 326 uses one or more of engine speed determined from the engine rotation sensor 318, a torque indicating characteristic (e.g. MAP or IMD) from the torque indicating characteristic sensor 316, and an indication of whether a knock event is occurring from the knock sensor 320. It is also anticipated that the ECM 104 may use other sensors alternatively or in combination with those discussed above. For example, in one instance, the operating ignition timing determiner 326 uses an intake air temperature sensor in determining the operating ignition timing.

The operating ignition timing determiner 326 can determine the operating ignition timing using a lookup table including one or more state parameters, for example engine speed and torque indicating characteristic, and/or one or more optional inputs, correlated to operating ignition timing values. Alternatively or in combination with a lookup table, the operating ignition timing can be determined from a formulaic calculation as a function of one or more state parameters, for example engine speed and torque indicating characteristic, and/or one or more optional inputs. Additionally, in either instance, the operating ignition timing can be adjusted, for example retarded, if a knock event is indicated by the knock sensor 320.

The ECM 104 includes a test timing adjust determiner 330 that receives an input from at least the knock sensor 320 and the engine torque indicating sensor 316. Periodically, or upon receipt of a signal, for example a signal from outside the ECM 104, the ECM 104 signals the test timing adjust determiner 330 to enter a test mode. In test mode, the test timing adjust determiner 330 determines from the engine torque indicating sensor 316 when the engine system is operating at or near full load. When the engine is at or near full load, the test timing adjust determiner 330 outputs a test advance value that advances the ignition timing for a subset of the combustion chambers 1, 2, 3 . . . n to actuate earlier than specified by the operating ignition timing. In one instance, the subset is a single combustion chamber. The remaining combustion chambers continue operating according to the operating ignition timing output by the operating ignition timing determiner 326. The test advance value is combined with the operation ignition timing for the subset of combustion chambers. The test advance value is incrementally increased over a number of cycles of the engine until a knock event is sensed by the knock sensor 320. When a knock event is sensed by the knock sensor 320, the test advance value is output to a knock margin analyzer 332 and the ignition timing of the subset of combustion chambers is returned to the operating ignition timing. The test timing adjust determiner 330 may then repeat the process for another subset of combustion chambers, and may continue until all of the combustion chambers or a specified group of combustion chambers have been tested. For example, if the test timing adjust determiner 330 advances the ignition timing to knock on a first combustion chamber, the test timing adjust determiner 330 can then advance the ignition timing to knock on a second combustion chamber, and so on until all of the combustion chambers or a specified group of the combustion chambers have been tested.

The knock margin analyzer 332 determines the knock margin for each of the subsets of combustion chambers tested by the test timing adjust determiner 330 as a function of the test advance value. In one instance, the test advance value found to produce a knock event is it equal to the knock margin. If the subsets tested by the test timing adjust determiner 330 were single combustion chambers, the knock margin analyzer 332 determines a knock margin for each combustion chamber. The knock margin is determined for a plurality of the subsets or all of the subsets. The knock margin data is compiled for each instance the test timing adjust determiner 330 has entered test mode.

The knock margin analyzer 332 can derive information about the operation of the combustion chambers and the combustion mixture supplied to the combustion chambers from the knock margin data and output both the knock margin data and the information derived from the data. The information and data may be an output from the knock margin analyzer 332 out of the ECM 104, for example for use by an operator or in other portion of the engine system, and/or may be output to other controls 334 within the ECM 104. The knock margin analyzer 332 can also communicate with the operating ignition timing determiner 326 to adjust the operating ignition timing as a function of the knock margin.

In certain embodiments, the knock margin analyzer 332 compiles the knock margin data for each of the combustion chambers for a plurality of instances of the test timing adjust determiner entering test mode. If the trend of the data indicates that the knock margin of all of the combustion chambers is changing, the knock margin analyzer 332 can infer that the composition of the combustion mixture is changing. For example, if the knock margin for all of the combustion chambers is decreasing, the quality of the fuel supplied to the combustion chambers can be inferred by the knock margin analyzer 332 to be degrading. If the knock margin for all of the combustion chambers is increasing, the quality of the fuel supplied to the combustion chambers can be inferred by the knock margin analyzer 332 to be improving. In certain embodiments, the knock margin analyzer 332 can determine a fuel knock resistance from the knock margin data. The fuel knock resistance can be determined with a lookup table correlating knock margin and fuel knock resistance and/or by a formulaic calculation. Both the knock margin data and the fuel knock resistance can be output from the ECM 104 for use by an operator, for example, in monitoring the operation of the engine system. In one instance, the knock margin may be used in estimating the power output of the engine. A low knock margin together with other information implies a high energy density in the fuel, and indicates a likely higher engine output.

In certain embodiments, the knock margin analyzer 332 can signal the operating ignition timing determiner 326 in response to the change in knock margin. For example, if the knock margin for all of the combustion chambers is decreasing, the knock margin analyzer 332 can signal to the operating ignition timing determiner 326 to retard the operating ignition timing in compensation for the change in knock margin of the fuel. If the knock margin for all of the combustion chambers is increasing, the knock margin analyzer 332 can signal to the operating ignition timing determiner 326 to advance the operating ignition timing. The amount that the operating ignition timing is retarded or advanced can be determined as a function of the magnitude (maximum, average, or other) of the knock margin or the fuel knock resistance.

Alternately, or in combination with signaling the operating ignition timing determiner 326, the knock margin analyzer 332 can signal other controls 332 in response to the knock margin or the fuel knock resistance. In certain embodiments, the knock margin analyzer 332 can signal a fuel controller to adjust the amount of fuel supplied to one or more of the combustion chambers. The amount of the adjustment made by the fuel controller can be determined as a function of the magnitude of the knock margin or the fuel knock resistance. For example, in an engine that is operating on a lean combustion mixture (more air or less fuel than stoichiometric), if the knock margin for all of the combustion chambers decreases, the knock margin analyzer 332 can signal the fuel controller to reduce the amount of fuel supplied to the combustion chambers. Reducing the amount of fuel supplied to the combustion chambers when they are already receiving a lean combustion mixture, reduces the combustion temperatures and the tendency of a knock event to occur. For example, in an engine running lambda 1.64, leaning the combustion mixture to lambda 1.68 may be enough to bring the engine out of knock. In an engine that is operating on a near stoichiometric combustion mixture, if the knock margin for all of the combustion chambers decreases, the knock margin analyzer 332 can signal the fuel controller to increase the amount of fuel supplied to the combustion chambers, thus reducing the tendency of a knock event to occur. In certain embodiments, the knock margin analyzer 332 can signal a controller to control the amount of cooled exhaust gas recirculated as a function of the magnitude of the knock margin or the fuel knock resistance. For example, if the knock margin of the affected combustion chambers is decreasing, the knock margin analyzer 332 can signal the controller to increase the amount of exhaust gas that is recirculated to the combustion chambers. Increasing the amount of cooled exhaust gas that is recirculated reduces combustion temperatures and the tendency of knock to occur. In certain embodiments, the knock margin analyzer 332 can signal a boost controller for a turbocharger or a supercharger to adjust the amount of boost supplied to the combustion chambers as a function of the magnitude of the knock margin or the fuel knock resistance. For example, if the knock margin for the affected combustion chambers is decreasing, the knock margin analyzer 332 can signal the boost controller to reduce the amount of boost supplied to the combustion chambers. Reducing the amount of boost supplied to the affected combustion chambers reduces the tendency of a knock event to occur. If the knock margin for the combustion chambers is increasing, the knock margin analyzer can signal the boost controller to increase the amount of boost supplied to the combustion chambers to take advantage of the increased knock margin and fuel knock resistance.

If the trend indicates that the knock margin of fewer than all of the combustion chambers is changing at a different rate than others of combustion chambers, the knock margin analyzer 332 can infer that the change in knock margin for the affected combustion chambers is not caused by a change in the properties of the fuel. Rather, the change in knock margin for the affected combustion chambers indicates a change in the affected combustion chambers themselves. For example, carbon or ash build up in a combustion chamber and other hot spots can reduce the knock margin. Reduced individual combustion chamber power from increased ring blow by and/or leaking valves increases the knock margin. In some instances, the rate of change in knock margin is different between each combustion chamber, because some differences in the combustion chambers that cause changes in knock margin form at different rates for different combustion chambers. Accordingly, the knock margin analyzer 332 can signal operating ignition timing determiner 326 or other controls 334 to compensate for differences between the combustion chambers. Additionally, the knock margin analyzer 332 can distinguish between changes in knock margin caused by changes in the fuel (by noting a change in the knock margin that is substantially the same for all of the combustion chambers) and changes in knock margin caused by changes in the combustion chambers (by noting a change in the knock margin that is different from others of the combustion chambers) and compensate for both.

To wit, if the knock margin for one or a subset of combustion chambers is decreasing, the knock margin analyzer 332 can signal the operating ignition timing determiner 326 to retard the operating ignition timing for the one or the subset of combustion chambers in addition to any other retard or advance applied to compensate for changes in the fuel. Likewise if the knock margin for one or a subset of combustion chambers is increasing, the knock margin analyzer 332 can signal the operating ignition timing determiner 326 to advance the operating ignition timing for the one or the subset of combustion chambers in addition to any other retard or advance applied to compensate for changes in the fuel. Similarly, the knock margin analyzer 332 can signal a fuel controller to adjust the amount of fuel supplied to the one or the subset of combustion chambers and/or a boost controller to adjust the amount of boost supplied to the one or the subset of combustion chambers to compensate for changes in the combustion chamber that affect knock margin.

The individual combustion chamber knock margins can be stored and/or trended to help identifying wearing cylinders. The data for the individual combustion chamber knock margins can be output from the ECM 104, for example for receipt by an operator and/or for use outside of the engine system.

Figure 4:
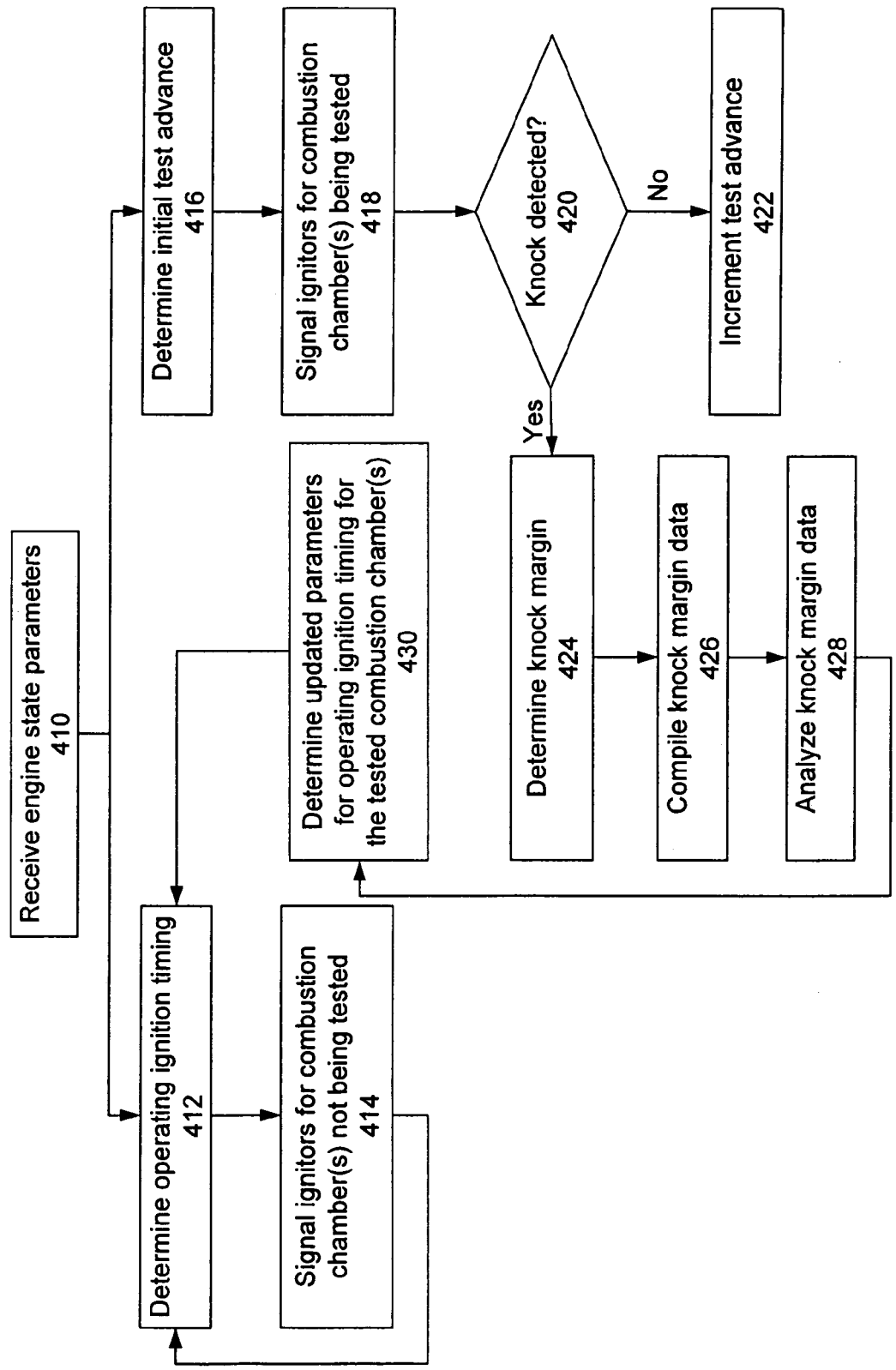
FIG. 4 is a flow diagram of the operation of an illustrative engine control module constructed in accordance with the invention.

Referring now to the FIG. 4, an illustrative operation of an ECM is depicted schematically. At operation 410, the ECM receives signals indicative of one or more engine state parameters. As noted above, the engine state parameters may in one instance include engine rotational position, an engine torque indicating parameter (e.g. MAP or IMD), input from a knock sensor, and others. The ECM may also receive signals indicative of additional information, such as intake air temperature and ambient humidity.

At operation 412, the ECM determines the operating ignition timing from the inputs received at operation 410, as well as inputs received from additional steps in the method. For example, the ECM can determine the operating ignition timing based at least in part on updated parameters determined for combustion chambers tested in operations 416-430 (discussed in more detail below), if such operations have been performed. At operation 414, the ECM signals ignitors for one or more combustion chambers to actuate the ignitors to begin an ignition event in accordance with the operating ignition timing. If one or more of the combustion chambers are being tested (operations 416-430), the ECM signals ignitors for one or more of the combustion chambers that are not being tested. The ECM continually cycles through operations 412 and 414 during operation of the engine.

If the ECM is operating to test one or more combustion chambers, for example, at specified intervals when the engine is at or near full load, the ECM performs operations 412-430. At operation 416, the ECM determines an initial test advance for the combustion chambers that will be tested. Fewer than all of the combustion chambers will be tested at one time, and in one instance one combustion chamber is tested at a time. The initial test advance may be preprogrammed into the ECM, determined as a function of the operating ignition timing, determined from previous test cycles, or determined in another manner.

At operation 418, the ECM signals ignitors for one or more combustion chambers that are being tested to actuate the ignitors to begin an ignition event according to the operating ignition timing combined with the test advance. At operation 420, the ECM determines whether a knock event has been detected, for example by input from a knock sensor. If a knock event has not been detected, at operation 422 the test advance is incremented up to yield more advance, and on the next cycle of the engine, operation 418 and operation 420 are repeated. Operations 418-422 are repeated on subsequent cycles of the engine until a knock even is detected. If a knock event has been detected, at operation 424 the knock margin is determined. Operations 416-424 may be repeated for others of the combustion chambers, and in one instance, operations 416-424 are repeated for all of the combustion chambers. The tested combustion chambers may be repeatedly tested by repeatedly performing operations 416-424.

At operation 426 the knock margin data determined at operation 424 for each of the tested combustion chambers is compiled, and at operation 428 the knock margin data is analyzed as described above. In certain embodiments, the knock margin data is analyzed to output a knock resistance of the fuel. In certain embodiments, the knock margin data is analyzed to identify wearing combustion chambers and/or changes to combustion chambers that affect knock margin, and such information can be output. At operation 430 updated parameters of adjustments to the operating ignition timing are determined for the tested combustion chambers as described above, and the updated parameters of adjustments are supplied to the operation 412 for determining operating ignition timing.

A number of embodiments of the invention have been described. Nevertheless, it will be understood that various modifications may be made without departing from the spirit and scope of the invention. Accordingly, other embodiments are within the scope of the following claims.

What is claimed is:

1. A method of operating a multiple combustion chamber internal combustion engine comprising:
    advancing an ignition timing of a first subset of the combustion chambers from an operating ignition timing until a knock event is detected while concurrently operating the remaining combustion chambers at the operating ignition timing;
    determining a first knock margin of the first subset of combustion chambers in relation to a difference between the operating ignition timing and the ignition timing at the knock event;
    advancing the ignition timing in a second subset of the combustion chambers from an operating ignition timing until a knock event is detected while concurrently operating the remaining combustion chambers at the operating ignition timing;
    determining a second knock margin of the second subset of combustion chambers in relation to a difference between the operating ignition timing and the ignition timing at the knock event; and
    determining a characteristic of a fuel supplied to the combustion chambers in relation to the first and second knock margins.

2. The method of claim 1 wherein determining a characteristic of the fuel supplied to the combustion chambers comprises determining a knock resistance of the fuel.

3. The method of claim 1 further comprising adjusting the operating ignition timing of the first subset of combustion chambers to a first operating ignition timing as a function of the knock margin determined for the first combustion chamber.

4. The method of claim 1 comprising adjusting the operating ignition timing of the second subset of combustion chambers to a second operating ignition timing as a function of the knock margin determined for the second combustion chamber.

5. The method of claim 4 wherein the first operating ignition timing and second operating ignition timing are different if the knock margin for the first subset of the combustion chambers is different than the second subset of the combustion chambers.

6. The method of claim 1 wherein the first subset is one of the multiple combustion chambers.

7. The method of claim 1 further comprising adjusting a fuel controller as a function of at least one of the first knock margin and the second knock margin.

8. The method of claim 7 further comprising adjusting a fuel controller to supply less fuel to the first subset of combustion chambers than is supplied to the second subset of combustion chambers if the first knock margin decreases.

9. The method of claim 7 further comprising adjusting a boost controller as a function of at least one of the first knock margin and the second knock margin.

10. A method comprising:
   (i) advancing an ignition timing of one combustion chamber of a multiple combustion chamber engine from an operating ignition timing until a knock event is detected while concurrently operating the remaining combustion chambers at the operating ignition timing;
   (ii) determining a knock margin of the one combustion chamber;
   (iii) repeating operations (i) and (ii) for subsequent of the combustion chambers until a knock margin has been determined for a plurality of the combustion chambers; and
   (iv) determining a characteristic of the fuel supplied to the combustion chambers in relation to the determined knock margins.

11. The method of claim 10 further comprising:
   repeating operations (i)-(iii) a plurality of times;
   determining from a difference in knock margin data between at least a first of the plurality of combustion chambers and another of the plurality of combustion chambers over the plurality of times that at least a portion of the change in knock margin of the first of the combustion chambers is due to a change in the first combustion chamber.

12. The method of claim 11 further comprising adjusting the operating ignition timing for the first the combustion chamber as a function of the change in knock margin.

13. The method of claim 11 further comprising adjusting at least one of an amount of fuel supplied to the first combustion chamber and an amount of boost supplied to the first combustion chamber as a function of the change in knock margin.

14. The method of claim 11 further comprising compiling knock margin data from the plurality of times operations (i)-(iii) are repeated and outputting the compiled knock margin data correlated to combustion chambers.

15. The method of claim 10 wherein determining a characteristic of the fuel supplied to the combustion chambers comprises determining a knock resistance of the fuel.

16. The method of claim 10 further comprising outputting information indicative of the knock margin.

17. The method of claim 10 wherein repeating operations (i) and (ii) for subsequent of the combustion chambers until a knock margin has been determined for a plurality of the combustion chambers comprises repeating operations (i) and (ii) until a knock margin has been determined for all of the combustion chambers.

18. A system for operating a multiple combustion chamber internal combustion engine, comprising a processor configured to perform operations comprising:
   advancing an ignition timing of a first subset of the combustion chambers from an operating ignition timing until a knock event is detected while concurrently operating the remaining combustion chambers at the operating ignition timing;
   determining a first knock margin of the first subset of combustion chambers in relation to a difference between the operating ignition timing and the ignition timing at the knock event;
   advancing the ignition timing in a second subset of the combustion chambers from an operating ignition timing until a knock event is detected while concurrently operating the remaining combustion chambers at the operating ignition timing;
   determining a second knock margin of the second subset of combustion chambers in relation to a difference between the operating ignition timing and the ignition timing at the knock event; and
   determining a characteristic of a fuel supplied to the combustion chambers in relation to the first and second knock margins.

19. The system of claim 18 wherein the processor is further configured to perform operations comprising determining a knock resistance of the fuel supplied to the combustion chambers.

20. The system of claim 18 wherein the processor is further configured to perform operations comprising adjusting the operating ignition timing of the first subset of combustion chambers to a first operating ignition timing as a function of the knock margin determined for the first combustion chamber.

* * * * *

UNITED STATES PATENT AND TRADEMARK OFFICE
CERTIFICATE OF CORRECTION

PATENT NO. : 7,383,816 B2
APPLICATION NO. : 11/328425
DATED : June 10, 2008
INVENTOR(S) : James Richard Zurlo It is certified that error appears in the above-identified patent and that said Letters Patent is hereby corrected as shown below:

In Column 9, Claim 12, line 31 – after "first" delete "the"

Signed and Sealed this

Twenty-sixth Day of August, 2008

JON W. DUDAS
*Director of the United States Patent and Trademark Office*